(12) United States Patent
Balasaygun et al.

(10) Patent No.: US 9,430,279 B2
(45) Date of Patent: Aug. 30, 2016

(54) SYSTEM AND METHOD FOR DYNAMIC INFLUENCING OF SEQUENCE VECTOR BY SEQUENCED APPLICATIONS

(75) Inventors: Mehmet Balasaygun, Freehold, NJ (US); Venkatesh Krishnaswamy, Holmdel, NJ (US); Ezra Gilbert, c/o Misgav (IL)

(73) Assignee: Avaya Inc., Basking Ridge, NJ (US)

( * ) Notice: Subject to any disclaimer, the term of this patent is extended or adjusted under 35 U.S.C. 154(b) by 735 days.

(21) Appl. No.: 13/477,109

(22) Filed: May 22, 2012

(65) Prior Publication Data

US 2013/0318541 A1 Nov. 28, 2013

(51) Int. Cl.
G06F 9/48 (2006.01)
H04L 29/06 (2006.01)

(52) U.S. Cl.
CPC ......... *G06F 9/4843* (2013.01); *H04L 65/1063* (2013.01); *H04L 65/1069* (2013.01); *H04L 65/1073* (2013.01); *G06F 2209/485* (2013.01)

(58) Field of Classification Search
None
See application file for complete search history.

(56) References Cited

U.S. PATENT DOCUMENTS

| 2004/0078686 | A1* | 4/2004 | Toyooka et al. | 714/38 |
| 2005/0108075 | A1* | 5/2005 | Douglis et al. | 705/8 |
| 2006/0168584 | A1* | 7/2006 | Dawson | G06F 9/5072 718/104 |
| 2009/0106571 | A1* | 4/2009 | Low et al. | 713/310 |
| 2010/0241577 | A1* | 9/2010 | Geppert | G06Q 10/10 705/304 |
| 2011/0145362 | A1* | 6/2011 | Jones | H04L 29/06 709/217 |
| 2012/0201238 | A1* | 8/2012 | Lawson et al. | 370/352 |
| 2013/0073601 | A1* | 3/2013 | Jenkins | G06F 9/547 709/201 |
| 2013/0232540 | A1* | 9/2013 | Saidi et al. | 726/1 |

* cited by examiner

*Primary Examiner* — Tuan Dao

(57) ABSTRACT

System and method to dynamically influence a sequence vector by a sequenced application, the method including: receiving, from an application, a profile of system resources used by the application; receiving a request to execute the application within a sequence vector of a call; receiving a resource availability status; and setting an execution status of the application if a system resource used by the application is not available.

20 Claims, 5 Drawing Sheets

SYSTEM AND METHOD FOR DYNAMIC INFLUENCING OF SEQUENCE VECTOR BY SEQUENCED APPLICATIONS

BACKGROUND

1. Field of the Invention

Embodiments of the present invention generally relate to call handling by sequenced applications, and, in particular, to a system and method for bypassing a sequenced application if inadequate system resources are available.

2. Description of Related Art

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using the AOR, a caller can reach any one of the user's communication devices, also referred to as User Agents (UAs) without having to know each of the unique device addresses or phone numbers.

Many SIP communications are enhanced by virtue of the fact that an application is inserted or included into the communication session during the establishment of that session. The incorporation of applications into a communication session is typically referred to as application sequencing because the applications are sequentially invoked during the establishment of the communication session. In some instances the applications are owned and operated by an enterprise that is administering the SIP network. In some instances, the applications may be provided by third-party vendors. In either event, the traditional way in which applications were included in the communication session was during the communication session establishment stage so that these applications can insert themselves into the signaling and media path of the communication session.

Exemplary types of applications that may be utilized for a communication session include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications.

Session managers such as Avaya Aura™ for enterprise telephony networks allow sequencing of network applications at session origination and termination phases, in order to affect the way the session is routed in the network. During the origination phase, the call is routed through the servers associated with the calling party's profile. During the termination phase, the call is routed through the servers associated with the called party's profile. The selection of network applications that are used during origination and termination sequencing phases is generally based on the identities of calling and called parties that are involved in a communication session. The list of servers (e.g., feature servers) that forms the sequence vector may be administered at user provisioning time. The calling party's provisioning profile provides the originating sequence vector whereas the called party's profile provides the terminating sequence vector. These two vectors combined provide a map of how a session initiation request travels from calling party to called party in the network.

Sequence vectors presently known in the art are static despite status changes that may occur in the applications that make up the sequence vector. For example, if an application that is in the sequence for a call were to fail, the call setup would fail even if the application is not critical for the completion of the call. However, if the session manager could skip over an application in distress or failure, or execute the application at a reduced level of performance, the call may be completed despite the application being in distress or failure. Currently, there is no easy way for applications that are in the sequence vector to inform a session manager about its current signaling and media status in order to influence the sequencing decision that a session manager makes as a session progresses through the network. Therefore, a need exists to provide dynamic adjustment to sequence vectors in order to provide more robust call handling when a noncritical application is in distress or failure.

SUMMARY

Embodiments of the present invention generally relate to call handling by sequenced applications, and, in particular, to a system and method for bypassing or operating at a reduced level of capability a sequenced application if inadequate system resources are available for the application.

In one embodiment in accordance with the present invention, a method to dynamically influence a sequence vector by a sequenced application includes: receiving, from an application, a profile of system resources used by the application; receiving a request to execute the application within a sequence vector of a call; querying a resource availability status; and setting an execution status of the application if a system resource used by the application is not available.

In one embodiment in accordance with the present invention, a system to dynamically influence a sequence vector includes: a processor configured to execute processes within the sequence vector; a first interface configured to receive, from the predetermined application, a profile of system resources used by the predetermined application; a second interface configured to receive a request to execute the predetermined application within the sequence vector; a status query module configured to query a resource availability status; and a status module configured to set an execution status of the predetermined application if a system resource used by the application is not available.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

Embodiments in accordance with the present invention provide a communication mechanism between the sequenced applications and a session manager to exchange information, to affect the routing decisions made during session routing.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
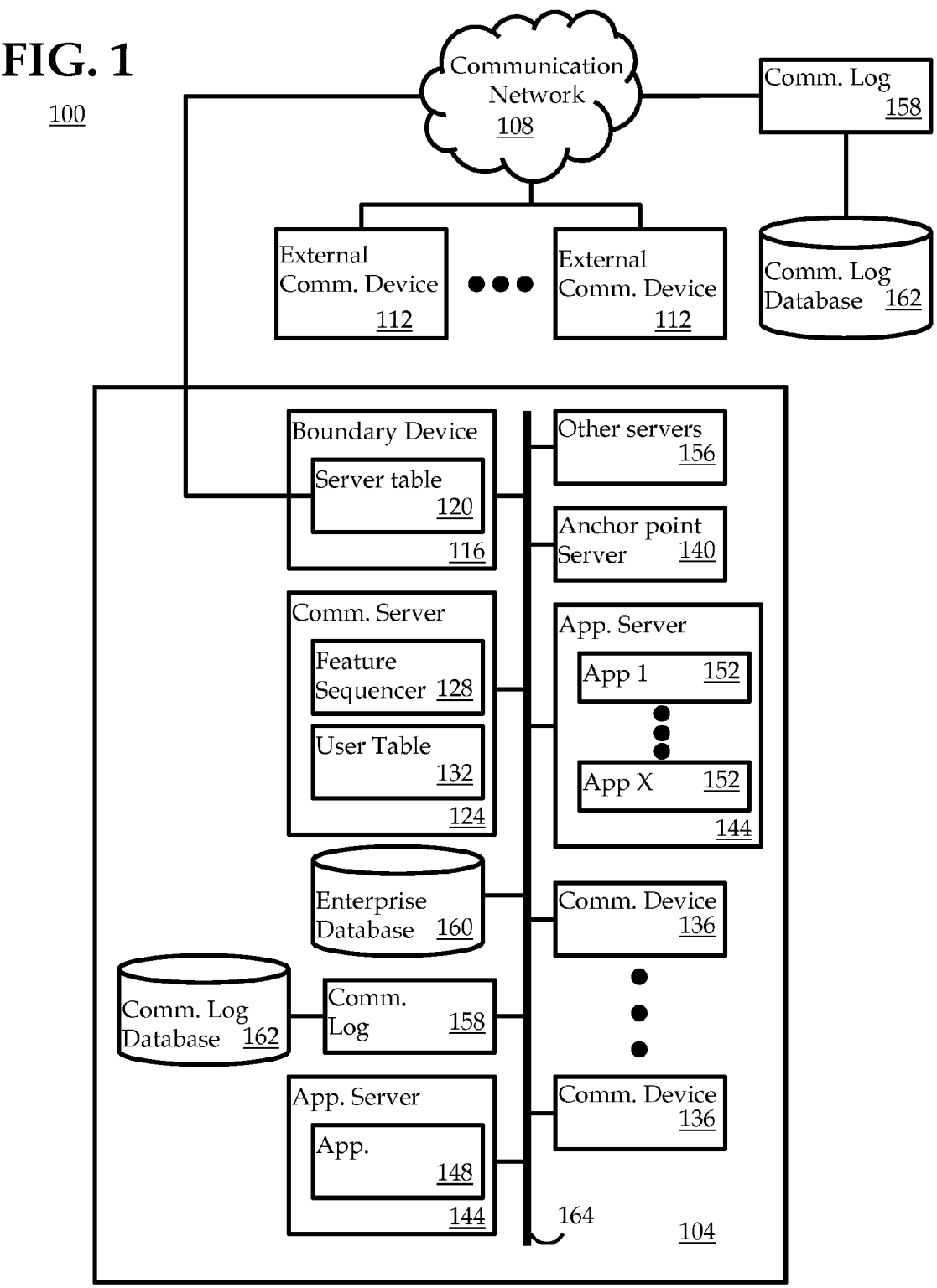
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

Embodiments of the present invention generally relate to call handling by sequenced applications, and, in particular, to a system and method for bypassing a sequenced application in whole or in part if inadequate system resources are available to support the sequenced application.

In another advantage, embodiments in accordance with the present invention may provide call handling capability at a reduced level of performance or capability, when inadequate system resources are available to provide call handling capability at a full level of performance or capability, which will provide customer communication when such communication would not otherwise be available.

In another advantage, embodiments in accordance with the present invention may avoid dropping calls, which would otherwise be necessary if inadequate system resources are available. For example, if a non-critical application requires more system resources than are available, then embodiments in accordance with the present invention may skip the application and process the call without the application.

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize sequenced applications in order to provide certain functionality for a communications call.

The exemplary systems and methods of this disclosure will also be described in relation to sequenced application software, modules, and associated sequenced application hardware. However, to avoid unnecessarily obscuring the present disclosure, the following description omits well-known structures, components and devices that may be shown in block diagram form, are well known, or are otherwise summarized.

Embodiments of the present invention generally relate to dynamic influencing of a sequence vector by a sequenced application, and, in particular, to a system and method for bypassing a sequenced application based upon criteria and status provided by the application and available system resources. Notification by the sequenced application may be by appropriate usage of an application profile registry accessed by a session manager, and status reports from applications to the session manager, Embodiments in accordance with the present invention provide solutions based on a standard protocol (e.g., SIP, H.323, etc.) for providing call setup and processing. Embodiments in accordance with the present invention furthermore provide improved availability by bypassing non-critical applications that may be in distress or failure.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "contact" (as in "customer contact") refers to a communication from a customer or potential customer, in which a request is presented to a contact center. The request can be by way of any communication medium such as, but not limited to, a telephone call, e-mail, instant message, web chat, and the like.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

As used herein in connection with embodiments of the present invention, the term "empower" refers to an ability by a party (e.g., a customer) to exercise rights, abilities, functions and so forth, which had been formerly and exclusively reserved for exercise by another party (e.g., a service agent).

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using the AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, e-mail accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

A SIP-based communication control system may be linked via communication channel to a wide area communication network as well. The communication control system may be, for instance, an Avaya Aura™ Session Manager. A communication channel may carry the real-time voice and video media stream under the direction and control of signals that conform to Session Initiation Protocol ("SIP"), also known as RFC 3261. The media stream(s) are communicated using a Real-time Transport Protocol ("RTP"), also known as RFC 3550 (formerly RFC 1889), for transporting real-time data and providing Quality of Service ("QoS") feedback.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered UDP port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 can actually provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Embodiments in accordance with the present invention enable dynamic alteration of an application sequence vector. Such a capability may be useful in a sequence vector when an application that is in distress can have its resource utilization lessened. A distressed application may be one in which the application's resource usage is unusually high, for resources such as memory, disk storage, network traffic, CPU utilization, operating system resources (e.g., thread pools, buffers, file descriptors, database connections, etc.), and/or resource utilization defined by the application (e.g. number of calls, etc.). Information about resource utilization may be sent to a session manager using status updates, e.g., SIP NOTIFY messages, or another notification mechanism.

Dynamic alteration of an application sequence vector may also be useful when an application that has stopped working can be bypassed while still processing the call with other applications in the sequence vector. An application may be designated as one that can be bypassed, at the time the application first initializes, by registering its application profile information with the session manager. The application profile information may include threshold information that indicates under what circumstances it should be bypassed. The application profile information may also include a "criticality" factor that indicates whether the application is allowed to be bypassed or whether the application is critical to the call, such that if the application is unavailable then the call should fail.

In some circumstances, rearranging the sequence of applications within the application sequence vector may be helpful rather than bypassing an application entirely. In such a situation, the order of application processing within a given stage of the call may not be critical to the application so long as the application is included at least somewhere within the sequence. If such an application reported a status of temporarily unavailable along with a time after which execution of the application may be attempted again, the session manager may delay accessing that application until the end of the sequence vector in case the application may have returned to service by that time.

When a sequenced application is ready to be executed, the application provides profile information to the session manager. For example, the information may be acted upon by feature sequencer 128, acting in communication with the session manager. Feature sequencer 128 may use the profile information together with the status information to determine how to sequence the call. A caller and/or callee may also have profile information that is accessible to the session manager, and which specifies what applications should be applied to a call involving the caller and/or callee. The sequence vector is the set of applications that comes into the picture during origination and termination sequencing phases and is generally based on the stored profiles. The profile information may include a purpose of the application since the session manager may be hard-coded or configured to treat certain categories of applications in a different way based on the application category.

The profile information may also include its signaling service parameters and, if applicable, media availability service parameters, i.e., the protocols used for establishing and controlling communication sessions (e.g., SIP).

The profile information may also include, if applicable, media availability service parameters based on criteria that can be described in a format that can be programmatically processed by the session manager (e.g., a format such as XML, regular expressions, etc). The application may have a finite availability of media resources or particular thresholds or limits for their usage. Resources can include any of the resources mentioned herein. The criteria may include maximum or minimum thresholds for service parameters and what action should be taken if the status updates match those criteria, e.g., allow an application to remain in the sequence path entirely for all sessions, allow the application to partially remain in the sequence path for certain sessions, or temporarily remove the application from the sequence path.

For an example in accordance with an embodiment of the present invention, a sequenced application that provides call recording capability may provide signaling and media thresholds to the session manager, potentially influencing the session manager's decision whether or not to sequence calls through the application.

A signaling threshold may be related to the number of simultaneous SIP messages, or transactions, or dialogs a network element can support. The signaling threshold may be related to monitored resources discussed herein. A SIP message that is processed by a network element involves parsing of the message, processing of the message, altering the state of the SIP transaction that the message is associated with, and possibly altering the state of the SIP dialog that the message is associated with. Each SIP transaction and dialog use take up memory resources in the network element that is in the middle of the signaling path.

A media threshold may be related to a quantity of media channels that can be simultaneously processed by a network application, e.g., the number of recording channels that a recording application can be engaged in. Physical capacity limits such as CPU speed, available hard disk memory can play a factor in determining one or more media thresholds associated with a sequenced application. For example, the threshold may indicate a policy such as:

(a) When operating at 40% capacity and below, accept call recording requests from anyone;

(b) When operating between 40-60% capacity, accept call recording requests from a predetermined group of users; and (c) When operating over 80% capacity, do not accept new call recording requests from anyone.

In this example, the call recording sequenced application may provide signaling and media service threshold information during the application's profile "registration" with the session manager. The profile information may include suggested redirection URLs for different service threshold levels so that the session manager can insert other network applications in the sequence path as suggested by the application in distress. The replacement application may have substantially similar functionality to the application that has been replaced, or the replacement application may have lower capacity or capability. The replacement application may also be beneficial if it executes on a server that currently has more resources available than the server that would execute the application originally specified in the sequence vector. For instance, for a replacement recording application may provide reduced set of functionality compared to an originally-sequenced application. For example, an originally-sequenced recording application may be capable of recording audio and video, whereas a replacement application may be capable of recording only the audio portion of a call session.

The redirection URL may be, for example, an Internet address for a service that is substantially the same as a service (or a subset of the service) provided by the application in distress. The profile information combined with status information is what the session manager uses to determine how to sequence calls through different applications.

During redirection, the originally-sequenced application network application that is in the sequence vector may be at a primary SIP address (e.g., main_recording_app.domain.com). The replacement recording application may be at a backup SIP address (e.g., "backup_recording_app.domain.com"). The originally-sequenced application may inform feature sequencer 128 that the backup application is available at the backup address. So, when the originally-sequenced main recording application reaches a certain capacity threshold, rather than denying service, feature sequencer 128 may insert the backup application in the sequence vector so that a recording service is not entirely denied to an end user.

Alternatively, the originally-sequenced recording application might not register its backup system information with the feature sequencer. Instead, if the originally-sequenced recording application reaches its capacity threshold, the originally-sequenced recording application may inform feature sequencer 128 about the address (e.g., URL) of the backup application. In this case, the re-direction to the backup system is under control of the originally-sequenced application that is experiencing service issues. The originally-sequenced application can thus control redirection on a per call basis. For example, call center calls may be recorded at the highest quality because call center employees may be the highest privileged user group for a recording application. Other users' calls may be re-directed to a backup system (with possibly reduced capability) based on capacity constraints for the main application.

Figure 2:
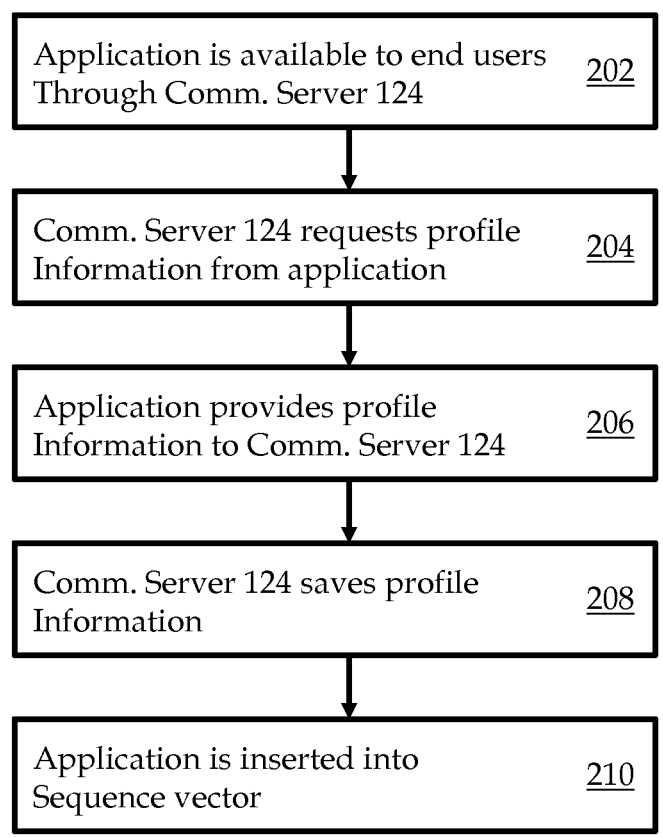
FIG. 2 illustrates at a high level of abstraction a process of registering an application with a session manager, in accordance with an embodiment of the present invention.

FIG. 2 illustrates a process 200 by which embodiments in accordance with the present invention may provide a registration mechanism so that a sequence application can register its profile information with the session manager. Process 200 begins at step 202 at which an application is available to end users through the session manager. The availability of the application is made known to the session manager and that the application is ready to register its profile information. When the application is initialized, either the application is informed of an address of the session manager, or the session manager is informed of an address of the sequenced application. If the application is to be informed, the application can transmit a message to an accessible address of the session manager. If the session manager is to be informed of the address of the sequenced application, the session manager may solicit profile information from the application when the application is brought under the control of the session manager by having been administered as a sequenced application.

The registration mechanism described herein may be used with other protocols. An application can inform feature sequencer 128 of the application's profile information in various different forms, e.g., XML over HTTP push of data, SIP registration, SIP publish, etc. An H.323 capable network application can, for example, use out of band XML/HTTP or some H.323 protocol extensions to let feature sequencer 128 know of its profile information.

At step 204, in an embodiment in accordance with the present invention, the session manager may initiate the registration mechanism as a SUBSCRIBE message that includes an event package. An event package may be an XML document that carries a set of information related to a particular subscription. For example, "dialog" event package may include an XML structure specifying the list of call sessions an endpoint is engaged in (e.g., one active call, one held call, two IM sessions, etc.). SIP-specific event notification, as described in RFC 3265, includes a subscription/notification mechanism.

At step 206, in an embodiment in accordance with the present invention, the sequenced application may report its profile to the session manager in a follow-up NOTIFY message. The registration mechanism later can also be used to carry application status updates back to the session manager. Alternatively, the application may use a PUBLISH message to publish its profile to the session manager, including a URI to which the session manager can send a SUBCRIBE message in order to receive status updates. At step 208, the session manager will save the profile information. At step 210, the application is inserted into the sequence vector.

Step 204 and step 206 may be described in further detail by reference to FIG. 4, which illustrates an embodiment of a process 400 and message exchange that implements feature sequencer 128 learning about a sequenced application's profile by way of a registration with subscription and notification model. Process 400 begins when sequenced application 450 sends message 402 (SIP:REGISTER (app address)) to feature sequencer 128. Feature sequencer 128 responds with message 404 (SIP:200OK (registration successful)) message, followed by message 406 (SIP:SUBSCRIBE) in order to subscribe to application profile events from sequenced application 450. Sequenced application 450 accepts the subscription by way of sending message 408 (SIP:200OK) and then sending message 410 (SIP:NOTIFY) to transmit the application profile information. Feature sequencer may acknowledge by use of message 412 (SIP: 200 OK).

Figure 5:
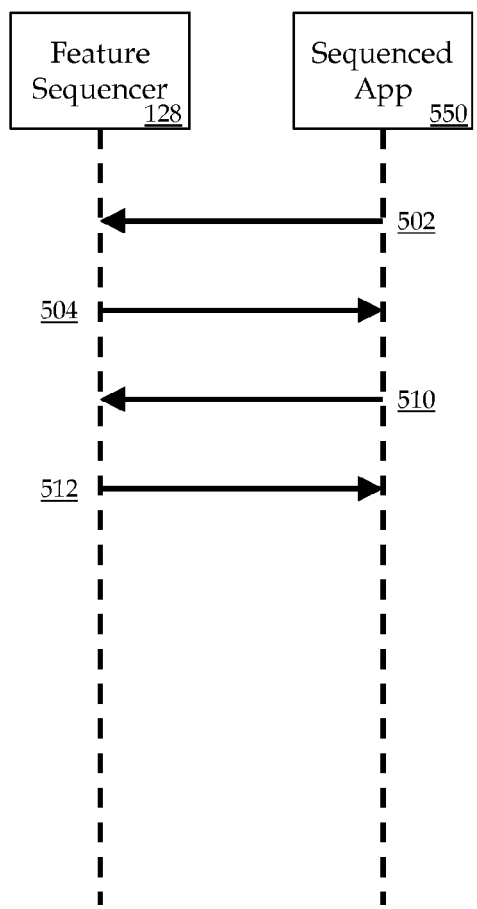
FIG. 5 illustrates an embodiment of a process and message exchange for a feature sequencer to learn about a sequenced application's profile.

In accordance with another embodiment of the present invention, a feature sequencer 128 may learn about a sequenced application's profile by way of a registration with subscription and publication model. FIG. 5 illustrates a process 500 and message exchange that implements such an embodiment. Process 500 begins when sequenced application 550 sends message 502 (SIP:REGISTER (app address)) to feature sequencer 128. Feature sequencer 128 responds with message 504 (SIP:200OK (registration successful)) message. Sequenced application 550 publishes its application profile information by way of message 510 (SIP:PUBLISH (application, profile information)). Feature sequencer may acknowledge the published profile by use of message 512 (SIP:OK).

Figure 4:
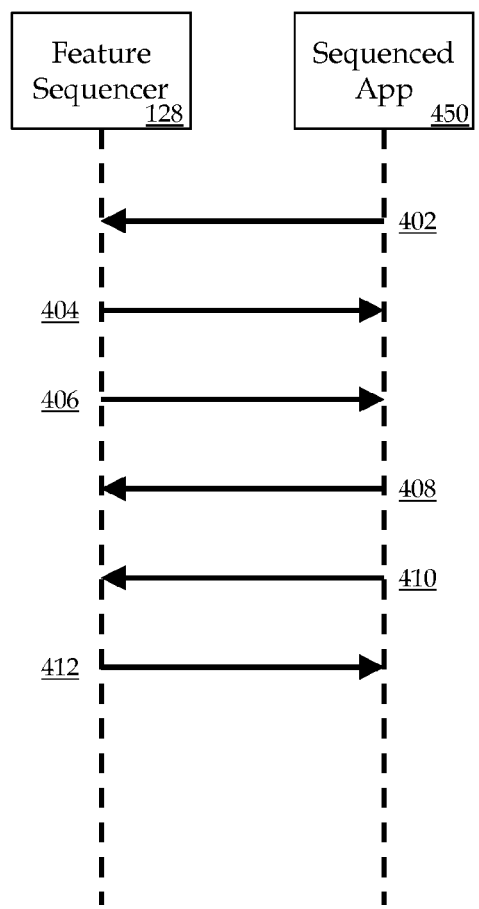
FIG. 4 illustrates an embodiment of a process and message exchange for a feature sequencer to learn about a sequenced application's profile.

FIGS. 4 and 5 rely upon the sequenced application knowing of the address for the feature sequencer. This knowledge can be acquired at provisioning time, manually by IT personnel entering the address information, or automatically using a service discovery technique (e.g., DNS SRV lookup).

Figure 3:
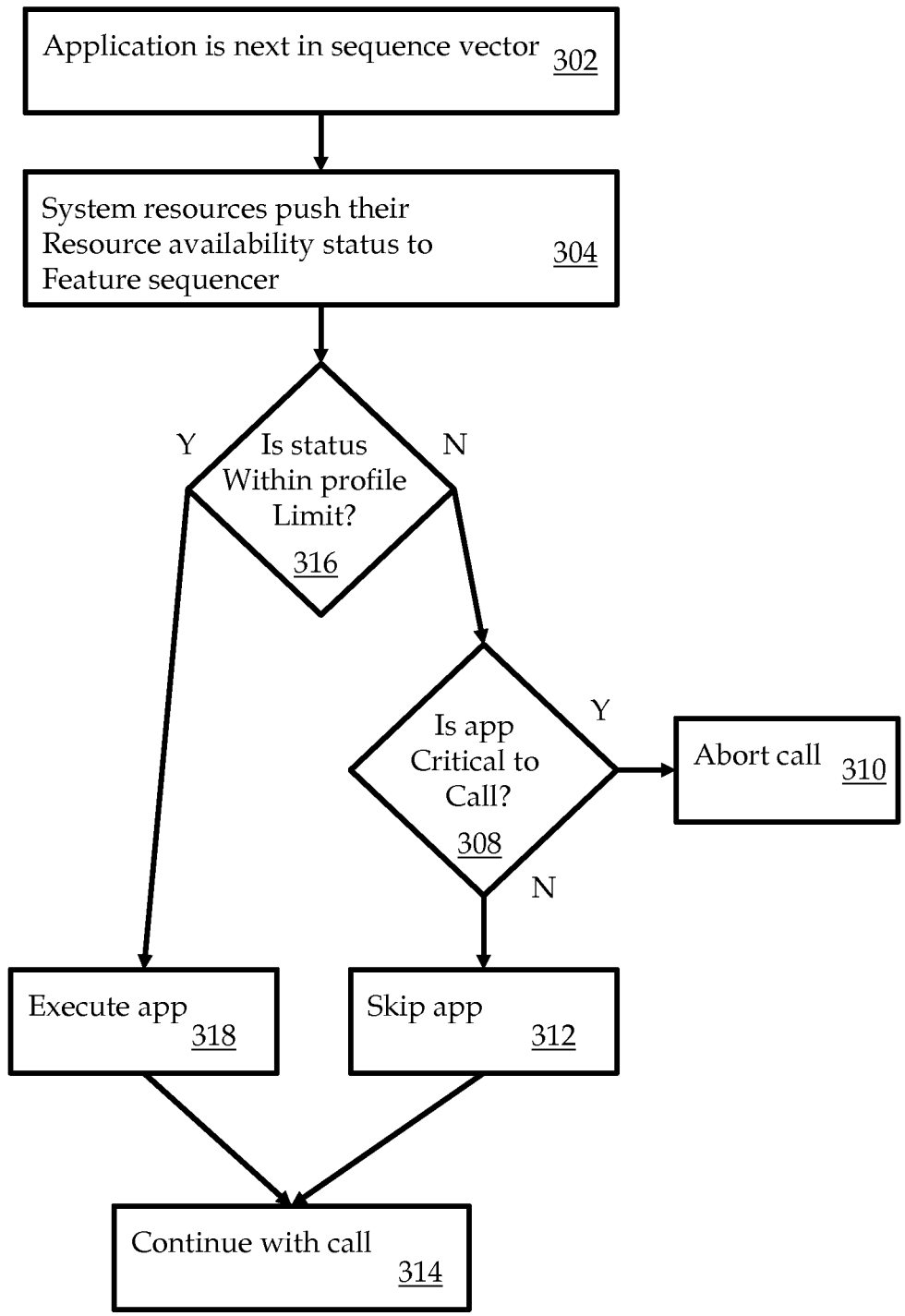
FIG. 3 illustrates at a high level of abstraction a process of dynamically influencing a sequence vector by a sequenced application, in accordance with an embodiment of the present invention.

FIG. 3 illustrates a process 300 by which embodiments in accordance with the present invention may provide a capability for a sequenced application to report its status information (e.g., current availability status) to the session manager, for signaling and media purposes. The report may be by way of notification messages. More particularly, FIG. 3 illustrates an embodiment of detecting a threshold issue with a sequenced application. In this embodiment, feature sequencer 128 queries for status for each request coming to feature sequencer 128.

In another embodiment in accordance with the present invention, detection may be by the application pushing status information to feature sequencer 128. Pushing status may allow feature sequencer 128 to make a routing decision without having to query an application server as often as in other embodiments. An application pushing status to feature sequencer 128 should be less demanding of application resources than having an application respond to status queries. Reducing demand on application resources may be important at a time when the application may be in distress.

Process 300 begins at step 302, at which an application in accordance with an embodiment of the present invention is the next application in the sequence vector to be scheduled by the session manager. At step 304, the feature sequencer may receive status information about resource availability and/or usage of components within system 100 in order to keep track of status of utilization of resources that are relevant to the application. The information may be received by way of push messages generated by a push process in communication with system resource managers. Relevant resources may include CPU utilization and/or memory availability of a processor that the application would execute on, or availability of communication interfaces used by the application, or availability of data needed by the application, and so forth. A push message for, e.g., memory utilization or CPU utilization may be generated from information supplied by a memory manager process or task manager process running on the CPU. The push message may be sent by a push process running on the CPU. Step 304 may include a query to the application itself, such as to determine whether the application has suffered any failures, what the present requirements are for resource usage, and so forth. The requested status will include information relevant to the profile information supplied by the application during process 200.

At step 306 a decision is made whether or not the application responded to the status request made at step 304, if such a status request was made to the application. The application may not respond, for example, if it has suffered some failure. If the application did not respond, control may pass to decision step 308, at which it is determined whether or not the application is critical to the call. Criticality may be with respect to either the calling party or the called party.

Criticality may be dependent upon a class or identity of a user. For example, a recording application may be critical for a member of a call center user group, but not for members of other user groups in an enterprise telephony network. In other words, criticality can be different based on the user that a call is associated with. In some embodiments, criticality may be included as part of the application profile. In other embodiments, criticality may be independently provisioned into feature sequencer 128, and does not have to be part of the application profile registration with feature sequencer 128. Criticality may also depend on circumstances or data dependencies among sequenced applications. For example, if an "upstream" application is skipped, and if a "downstream" application is data-dependent upon the upstream application, then the downstream application may fail. If the application is critical, control passes to step 310 at which the call is aborted. If the application is not critical to call handling, control or process 300 passes to step 312, at which a status of the application is set. The status may include at least an indication related to the execution status of the call. For example, the execution status of the application may include an indication whether the application should be skipped entirely, or whether some function (less than the entire functionality) of the application is at least is not fully executed, or whether the application may be executed at a reduced level of performance (e.g., reduced speed, recording capacity, resolution, sampling rate, etc.), and so forth.

Control of process 300 then passes to step 314 at which the call continues, which may includes the session manager executing the next sequenced application in the sequence vector.

If the result of step 306 is that the sequenced application did respond with its status relevant to the profile provided in process 200, then control of process 300 passes to step 316, at which the session manager checks whether the status is within profile limits. If the status is not within profile limits, then control passes to step 308, after which process 300 proceeds as described above. Optionally (not illustrated in FIG. 3), if the status is not within profile limits, and before control can pass to step 308, if a substitute application is available (i.e., a redirect application or an application that functionally similar but less resource-intensive), then control may pass to the substitute application.

If the outcome of step 316 is that the status of the application is within its profile limits, then control of process 300 passes to step 318, at which the application is executed. Execution of the application may include execution at a reduced level of performance, if the reduced level of performance has been defined in the application's profile. Then control of process 300 passes to step 314 at which the call continues, which may includes the session manager executing the next sequenced application.

Figure 6:
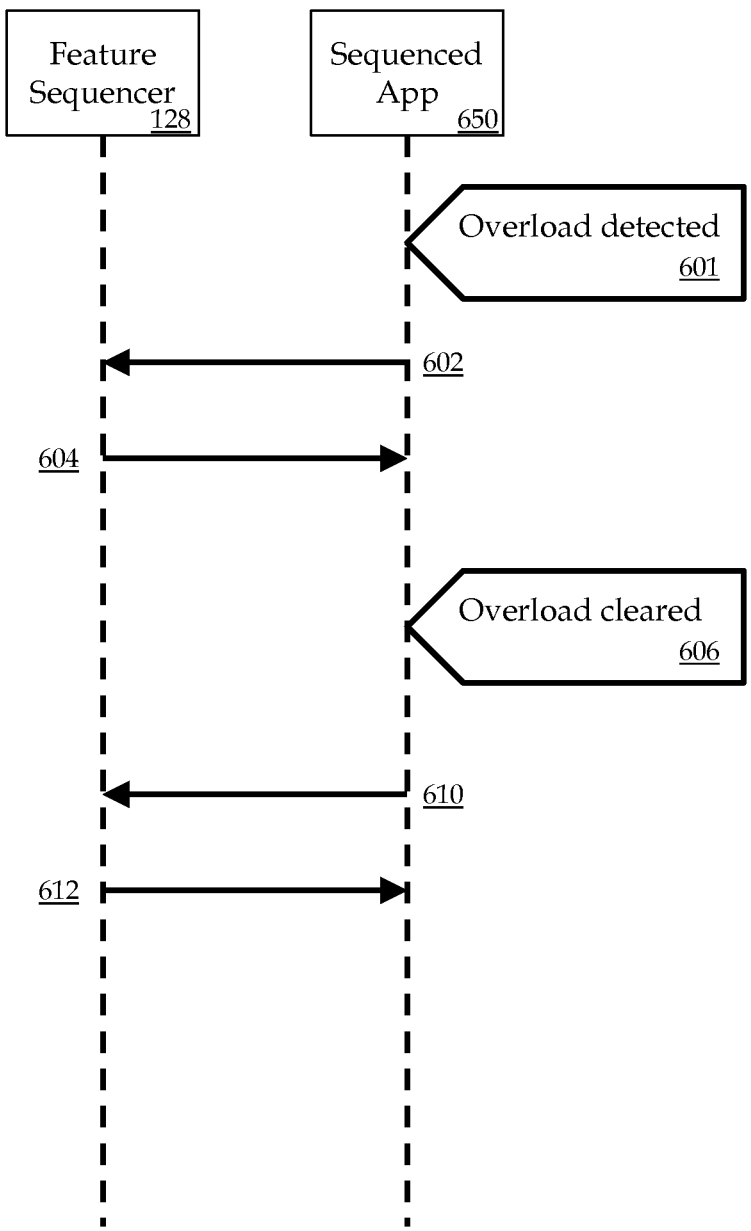
FIG. 6 illustrates an embodiment of a process and message exchange for a sequenced application to report a change of state to a feature sequencer.

FIG. 6 illustrates a process 600 in accordance with an embodiment of the present invention, wherein a sequenced application 650 informs feature sequenced 128 about a change of state of the capacity of the sequenced application 650.

Upon the start of process 600, it is assumed that the sequenced application 650 has already been registered with feature sequencer 128, for instance by use of process 400 and/or process 500. Further assume that upon entry into process 600, a state of sequenced application 650 has changed sufficiently such that the change of status should be reported to feature sequencer 128.

Process 600 begins at step 601 when an overload 601 has been detected by sequenced application 650. In response, sequenced application 650 sends a SIP:PUBLISH(app stateinfo) message 602 to feature sequencer 128. Feature sequencer 128 acknowledges the state information published by sequenced application 650, by use of message 604.

At some later time during process 600, sequenced application 650 becomes aware at step 606 that the overload condition has cleared sufficiently such that the change of state should be reported to feature sequencer 128. A hysteresis may be included in the determination whether the clearing is sufficient to be reported, in order to avoid unnecessary cycles of clearing and re-detection due to relatively minor fluctuations in the state of sequenced application 650. At step 610, sequenced application 650 sends a SIP:PUBLISH(app stateinfo) message to feature sequencer 128. Feature sequencer 128 acknowledges the state information published by sequenced application 650, by use of message 612.

Although process 600 has been described in terms of a SIP-based message exchange, it should be understood by persons of skill in the art that the status information of sequenced application 650 may be conveyed using XML over HTTP, as long as feature sequencer 128 implements an HTTP interface for collecting status information from sequenced application 650.

In a first example in accordance with an embodiment of the present invention, assume a call recording application is implemented as a sequenced application and is deployed in an enterprise where the telephony system is shared by non-contact-center corporate employees as well as contact-center employees. For reasons such as quality control or regulatory compliance, the calls made or received by contact-center employees may always be recorded, whereas calls made or received by non-contact-center corporate employees within the enterprise are recorded only when a user chooses to activate the recording feature. Embodiments in accordance with the present invention may provide that the call recording sequenced application may report its service profile in such a way that when it is operating at less than 70% capacity, the sequenced application allows recording requests from any employee. Over 70% of capacity, the sequenced application may allow recording requests only for contact-center related calls. This type of selective service availability during overload times can be implemented by the session manager so that calls that are not associated with the contact center are routed without the call recording application in the sequence vector. Hence the status of the call recording application can influence the sequence vectors of calls going through the session manager dynamically.

In a second example in accordance with an embodiment of the present invention, a sequenced "do not disturb" ("DnD") application may indicate by its profile to the session manager that the sequenced application provides optional call treatment service, and that its unavailability should not cause a service disruption. Therefore, if the DnD application becomes unresponsive, the session manager is permitted to skip the DnD application for a call even though the DnD application may be included in a sequence vector for the call. So instead of waiting for the DnD application, the session manager may continue with the rest of the applications referenced in the sequence vector. In this example, the session manager uses a "criticality" factor indicated in the application profile in order to determine whether to proceed with the call or to terminate the call based upon a failure of the sequenced application.

Embodiments in accordance with the present invention involve having a sequenced application register a profile or characteristics of the sequenced application with the session manager so that the session manager, by using dynamic status information received from the sequenced applications, can determine whether or not to include the application in the sequence vector for all sessions, or whether to allow the application to be included in the sequence vector for certain predetermined calls using criteria indicated in the sequenced application profile, or whether to temporarily remove the sequenced application from the sequence vector.

Embodiments of the present invention include a system having one or more processing units coupled to one or more memories. The one or more memories may be configured to store software that, when executed by the one or more processing unit, allows a customer service agent to escalate the mode of support provided to a customer during customer service scenarios, at least by use of processes described above in FIGS. 3 and 4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to dynamically influence a sequence vector by a sequenced application, comprising:
   receiving, by a communication server, a profile of one or more system resources used by the sequenced application;
   receiving, by the communication server, a request to execute the sequenced application within the sequence vector of a communication session, wherein the sequence vector comprises a set of a plurality of applications associated with the communication session, the applications being executed in a sequential order specified in the sequence vector;
   receiving, by the communication server, a resource availability status for each of the one or more system resources used by the sequenced application; and
   setting, by the communication server, an execution status of the sequenced application based on the resource availability status of one or more of the one or more system resources used by the sequenced application.

2. The method of claim 1, further comprising:
   executing, by the communication server, the sequence vector without execution of the sequenced application.

3. The method of claim 1, further comprising:
   terminating execution, by the communication server, of the sequence vector without execution of the sequenced application.

4. The method of claim 1, wherein the execution status comprises an indication whether the sequenced application should be skipped.

5. The method of claim 1, wherein the execution status comprises an indication whether a function less than an entire functionality of the sequenced application should be skipped.

6. The method of claim 1, wherein the execution status comprises an indication whether the sequenced application should be executed at a reduced level of performance.

7. The method of claim 1, wherein one of the one or more system resources comprises CPU utilization.

8. The method of claim 1, wherein one of the one or more system resources comprises memory utilization.

9. The method of claim 1, wherein the profile further comprises a category of the sequenced application.

10. The method of claim 1, wherein the profile further comprises a redirection URL, wherein the redirection URL comprises an Internet address for a service that is substantially the same as a service provided by the sequenced application.

11. A system to dynamically influence a sequence vector associated with a communication session, by a predetermined sequenced application within the sequence vector, the system comprising:
    a memory storing executable code, and
    a processor in communication with the memory, the processor when executing the executable code:
    receives, by a first interface, from the predetermined sequenced application, a profile of one or more system resources used by the predetermined sequenced application;
    receives, by a second interface, a request to execute the predetermined sequenced application within the sequence vector, wherein the sequence vector comprises a set of a plurality of applications associated with the communication session, the applications being executed in a sequential order specified in the sequence vector;
    receives a resource availability status for each of the one or more system resources used by the sequenced application; and
    sets an execution status of the predetermined sequenced application based on the resource availability status of one or more of the one or more system resources used by the predetermined sequenced application.

12. The system of claim 11, wherein the processor when executing the executable instructions:
    skips the predetermined sequenced application while executing the sequence vector.

13. The system of claim 11, wherein the processor when executing the executable instructions:
    terminates execution of the sequence vector without execution of the predetermined sequenced application.

14. The system of claim 11, wherein the execution status comprises an indication whether the predetermined sequenced application should be skipped.

15. The system of claim 11, wherein the execution status comprises an indication whether a function less than an entire functionality of the predetermined sequenced application should be skipped.

16. The system of claim 11, wherein the execution status comprises an indication whether the predetermined sequenced application should be executed at a reduced level of performance.

17. The system of claim 11, wherein one of the one or more system resources comprises CPU utilization.

18. The system of claim 11, wherein one of the one or more system resources comprises memory utilization.

19. The system of claim 11, wherein the profile further comprises a category of the predetermined sequenced application.

20. The system of claim 11, wherein the profile further comprises a redirection URL, wherein the redirection URL comprises an Internet address for a service that is substantially the same as a service provided by the predetermined sequenced application.

* * * * *